INVENTOR:
KARL HEINZ SCHÜTZ

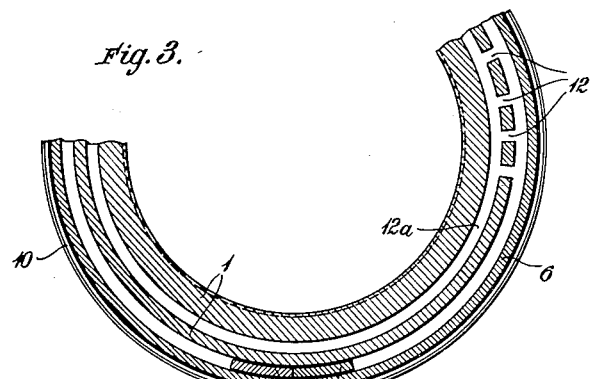
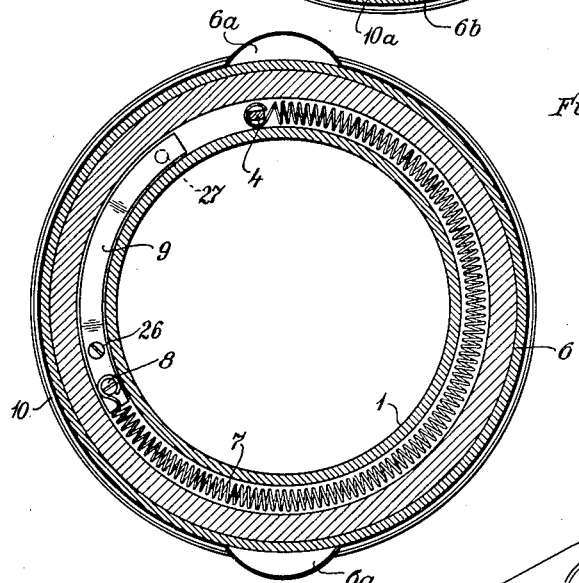
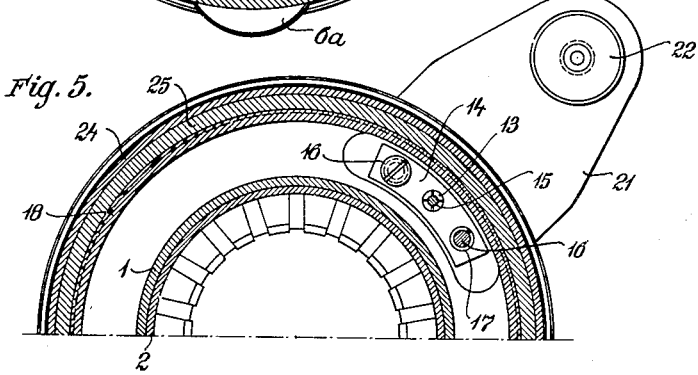

United States Patent Office 2,777,371
Patented Jan. 15, 1957

2,777,371

OPTICAL SYSTEM WITH AUTOMATIC DIAPHRAGM RETURN TO PRESELECTED POSITION

Karl Heinz Schütz, Bad Kreuznach, Germany, assignor to Jos. Schneider & Co., Kreuznach, Rhineland, Germany Application October 21, 1952, Serial No. 315,921

Claims priority, application Germany January 15, 1952

4 Claims. (Cl. 95—64)

The present invention relates to an optical system for photographic cameras and the like, wherein a diaphragm is adapted to be first adjusted to maximum opening or some other predetermined position (e. g. for view-finding purposes) and thereafter to return automatically to a preselected operating position, preferably simultaneously with the operation of a shutter release or the like.

In my earlier application Ser. No. 165,193, filed May 31, 1950, now Patent No. 2,612,093, issued September 30, 1952, I have disclosed an optical system of this character in which the desired mode of operation is obtained with the aid of an axially as well as rotatively displaceable control member. One of the objects of my present invention is to provide a comparable arrangement in an optical system of the type comprising an objective with screw-threaded focusing tube for axial displacement of the usual lens barrel, the arrangement being such as to utilize the focusing tube itself as a support or guide for part of the release mechanism whereby a particularly compact structure is obtained. Another object of this invention is to provide means for securely indexing a control member in a preselected position so as positively to arrest the diaphragm in such position after releasing the mechanism temporarily detaining it in a position of maximum opening. A further object is to provide manually operable means for operating the diaphragm release mechanism and simultaneously actuating a conventional trip member serving for the release of the shutter.

The above objects are realized, in accordance with the present invention, by the provision of a diaphragm release mechanism comprising an axially fixed support carrying an actuating member, diaphragm control means on the movable lens barrel separated from the actuating member by the focusing tube, and a coupling device lodged in the focusing tube and adapted to transmit movements of the actuating member to the control means irrespective of the axial position of said tube; more specifically this coupling device may include a normally open clamp arranged to be closed by the actuating member so as to engage a rod or pin which passes axially through the focusing tube, this pin being capable of following freely any axial displacement of the tube occurring in the open position of the clamp. There is preferably also provided, in combination with the release mechanism referred to, a diaphragm-adjusting member adapted to fall into any one of several radial slits formed in the lens barrel, whereby this member is positively locked against angular displacement under the impact of the rotating elements of the diaphragm control means when the latter are returned, as by the action of a spring, to preselected position following operation of the release mechanism. The actuating member itself may be so positioned, according to still another feature of the invention, as to register with the usual shutter release button or other trip member and to operate the latter immediately after the return of the diaphragm control means to preselected position.

The invention will be described in greater detail with reference to the accompanying drawing in which:

Figs. 2, 3, 4 and 5 are fragmentary sectional views taken on the lines II—II, III—III, IV—IV and V—V, respectively, of Fig. 1.

Figure 1:
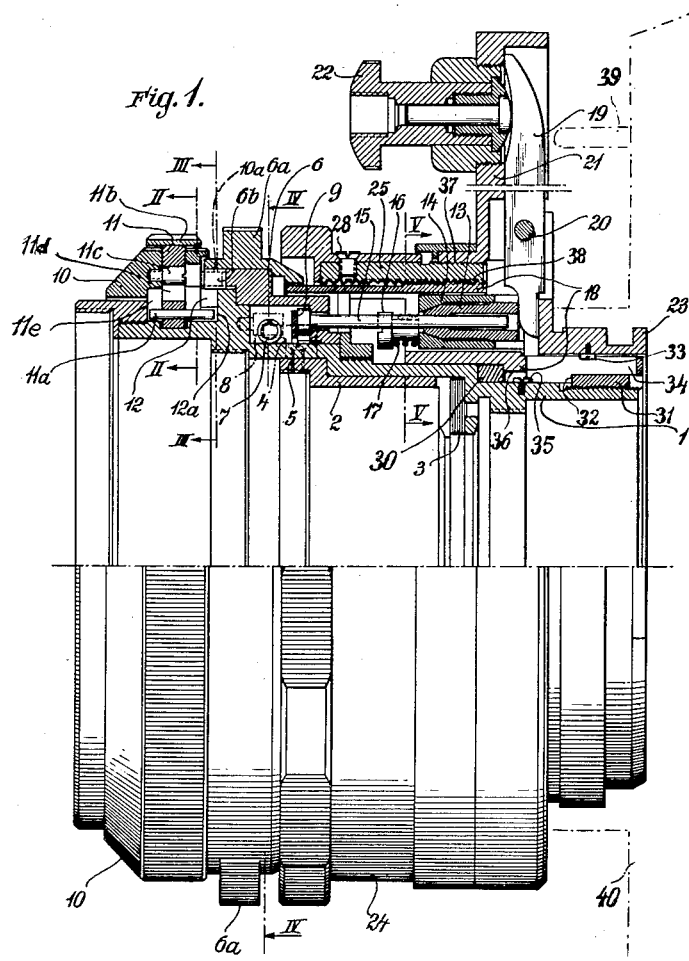
Fig. 1 is a side elevation, partly in section, of a photographic objective (with lenses removed) representing an embodiment of this invention.

Referring to the drawing, there is shown at 1 the lens barrel containing the usual grooved diaphragm guide ring 2 and the iris leaves 3. Secured to the ring 2, by means of countersunk screws 5, is a lug 4 which passes through an arcuate slot (not shown) in the lens barrel 1 and also engages a control ring 6 surrounding the lens barrel, thereby coupling the rings 2, 6 for simultaneous rotary movement to the extent allowed by the length of the arcuate slot. The ring 6 is provided with a pair of oppositely arranged knurled ears 6a and with a stop or abutment 6b. At 7 there is shown a tension spring having one end anchored to the lug 4 and having its other end attached to the lens barrel 1 by means of a cylinder screw 8. Inasmuch as neither the lug 4 nor the screw 8 is located within the sectional plane of Fig. 1, they have been shown in that figure in dot-dash outlines.

A detent spring 9, secured to the lens barrel 1 at 8, 26, bears on its free end a projection 27 arranged to snap into a corresponding recess in the ring 6 when the latter occupies the position of maximum opening shown in Fig. 4. The usual diaphragm scale, not shown, is carried by an indicator ring 10 having a stop 10a which normally is in contact with the abutment 6b of control ring 6, the latter abutment being urged against the stop 10a by the action of spring 7 as shown in Fig. 3; when the two stops are thus in contact with each other, the actual opening of the iris diaphragm 3 corresponds to that read on the scale of ring 10.

Figure 2:
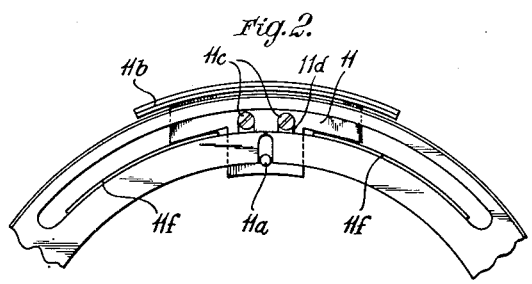

The mechanism for setting the diaphragm includes a selector or knob 11 comprising an index pin 11a and an externally positioned, knurled segment 11b, the latter being guided for radial movement by means of mounting screws 11c passing through slots 11d. The forward end of pin 11a (on the left as viewed in Fig. 1) plays in a slot 11e formed in the indicator ring 10; leaf springs 11f, secured to this ring, tend to maintain the selector 11 in a raised or outward position in which the rear end of pin 11a engages one of several radial slits 12 provided in the lens barrel 1, each of these slits corresponding to one of the various diaphragm openings marked on the scale of the indicator ring. Figs. 1 and 2 show the selector 11 depressed, against the force of springs 11f, into a position in which the pin 11a enters a clearance 12a in lens barrel 1 and is thus disengaged from the slits 12.

The rear part of the objective shown in Fig. 1 comprises a bayonet coupling 23 for attaching it to the body of, for example, a reflex-type camera indicated diagrammatically at 40. Lodged in this coupling in angularly fixed but axially movable position is the focusing tube 18 adapted to be displaced by a setting ring 25 threadedly engaged therewith at 38, this ring 25 being secured by screws 28 to the focusing sleeve 24 and being threadedly held at 37 in the coupling 23. The focusing tube 18, a longitudinal slit 34 of which is engaged by a guide screw 33 on coupling 23, is traversed by a release pin 15 whose forward end is in contact with the detent spring 9 and whose rear end is surrounded by the conical jaws of a clamp 13; these jaws are telescoped within an internally tapered, segmental bushing 14 which is axially slidable in a corresponding recess of the tube 18 but is normally pressed toward the rear of said tube (to the right in Fig. 1) by means of springs 17 surrounding mounting bolts 16 through which the bushing 14 is attached to the member 23. Under these circumstances there is only slight friction between the clamp 13 and the pin 15 which latter, therefore, will be displaceable with respect to the clamp in response to any axial displacement of the tube 18 by means of the focusing mechanism 24, 25. Such axial displacement, it may be noted, occurs upon rotation of the sleeve 24 by virtue of the fact that the pitch of the threads 38 is considerably greater than that of the threads 37. It may further be mentioned that the members 1, 18 are secured together with the aid of a threaded sleeve 31 abutting a shoulder 32 on the tube 18 and screwed onto the rear end of lens barrel 1 so as to urge these two members against a spacing ring 30; a screw 35 on barrel 1, entering a slot 36 in tube 18, positively maintains the barrel and the tube in fixed relative angular position.

Rising immediately behind the rear end of clamp 13 is a lever 19 pivoted at 20 to a projection 21 which extends upwardly from the coupling member 23. A release button 22 abuts the upper end of lever 19 in such manner that finger pressure upon the button 22 will act to swing the lever clockwise (as viewed in Fig. 1) whereby the lower end of the lever will push the clamp 13 toward the left, i. e. toward the front of the objective; substantially simultaneously therewith the upper end of lever 19 will depress the usual shutter release knob 39 which is positioned immediately behind the lever when the device of Fig. 1 has been attached to the camera 40 by means of the bayonet coupling 23.

The operation of the system shown in the drawing is as follows:

(a) *Preselection of diaphragm opening.*—By depressing the knurled segment 11b with the thumb of one hand, the user displaces the selector 11 downwardly and thus positions the index pin 11a within the clearance 12a of the lens barrel 1; now the indicator ring 10 can be rotated in either direction into a position corresponding to the desired diaphragm setting, whereafter the segment 11b is released and the pin 11a is allowed to enter the corresponding slit 12. Ordinarily, the stop 6b will have followed the movement of stop 10a so that the diaphragm guide ring 2, coupled with the control ring 6 by means of the lug 4, now occupies a position corresponding to that of the indicator ring which we shall assume to be different from the position of maximum diaphragm opening.

(b) *Adjustment of full diaphragm opening.*—The user may now desire to use the view finder (not shown) which, in a manner well understood in the art, utilizes the objective of Fig. 1 in common with the camera proper. In most cases he will find it desirable for this purpose to set the diaphragm to full opening, which he can readily do by rotating the control ring 6 (with the aid of the ears 6a) without disturbing the setting of the indicator ring 10. When the control ring 6 has reached its extreme position, the projection 27 on spring 9 enters the corresponding recess to hold the ring 6 in place against the force of spring 7. At the same time the iris leaves 3 are maintained in wide-open position by the diaphragm guide ring 2 which has followed the movement of the control ring.

(c) *Return to preselected diaphragm opening.*—When the user presses the button 22, this movement is communicated to the lever 19 and, thereby, to the clamp 13 which is thus forced into closer engagement with the bushing 14. The springs 17 are strong enough to resist any forward movement of the bushing 14 until the latter has, by a camming action, caused the gripper jaws of clamp 13 to close tightly around the rod 15, so that this rod is moved to the left (as viewed in Fig. 1) and disengages the detent spring 9 from the ring 6. Spring 7 thereupon instantaneously returns the control ring to the previously selected position in which the stop 6b is arrested by the abutment 10a, the resulting impact being unable to dislodge the diaphragm control assembly 10, 11 because of the positive engagement of the index pin 11a with one of the slits 12. An instant later the pressure of lever 19 upon knob 39 causes the operation of the shutter which is thus timed to occur immediately after the return of the diaphragm to its preselected position.

It will be apparent from the preceding description that the arrangement herein disclosed will insure a substantially invariable length of travel for the pin 15, in any position of the focusing tube 18, which will always be adequate to inactivate the detent 9 for the proper functioning of the mechanism.

The invention is, of course, not limited to the specific arrangement described and illustrated but may be embodied in a variety of structures without departing from the spirit and scope of the invention as defined in the appended claims.

I claim:

1. In a photographic objective of the type adapted to serve both for picture-taking and for view-finding purposes and comprising a lens barrel, a diaphragm in said lens barrel, diaphragm-adjusting means on said lens barrel selectively settable in a plurality of operating positions corresponding to various openings of said diaphragm, a support for said lens barrel and focusing means for axially displacing said lens barrel with respect to said support, said focusing means comprising a pair of threadedly mating tubes including a first, rotatable tube of restricted axial mobility on said support and a second, axially displaceable tube operatively joined to said lens barrel and held on said support against rotation: the combination with said lens barrel and focusing means of control means on said lens barrel operable to disengage said diaphragm from said diaphragm-adjusting means and to place said diaphragm in a wide-open position, spring means on said lens barrel tending to actuate said control means for removing said diaphragm from said wide-open position and returning it to a position determined by the setting of said diaphragm-adjusting means, detent means on a forward part of said lens barrel adapted to engage said control means for retaining said diaphragm in said wide-open position against the force of said spring means, and release means for inactivating said detent means, said release means including an actuating element positioned back of said tubes on said support and mechanism on said lens barrel operatively connecting said actuating element with said detent means; said mechanism comprising a clamp axially slidable in said second tube including cam means and normally open gripper means of limited relative axial mobility, pressure means bearing upon said cam means and, through the latter, upon said gripper means in a direction urging said gripper means toward said actuating element, an elongated transmission element passing through said gripper means and through said second tube substantially parallel to the axis of the latter, and coupling means operatively linking said transmission element with said second tube for axial entrainment thereby, said cam means closing said gripper means about said transmission element upon displacement of said gripper means by said actuating element against the action of said pressure means, said coupling means being at least partly resilient to a sufficient extent to enable axial displacement of said transmission member, relative to said second tube, in response to continued pressure upon said gripper means from said actuating element.

2. The combination according to claim 1 wherein said control means comprises a manually rotatable ring coupled to said diaphragm, said detent means comprising a leaf spring anchored to said lens barrel and having a formation adapted to engage a cooperating formation on said ring in a predetermined angular position of the latter, said transmission element being positioned for contact with said leaf spring and displacement thereof in response to pressure from said actuating element.

3. The combination according to claim 2 wherein said leaf spring forms part of said coupling means, said coupling means further including abutting formations on said transmission element and on said second tube limiting unidirectional relative displacement thereof.

4. The combination according to claim 1 wherein said cam means and said gripper means are a pair of telescoped tubular members, said transmission element being a pin passing substantially centrally through said tubular members.

References Cited in the file of this patent

UNITED STATES PATENTS

| 907,486 | Felt | Dec. 22, 1908 |
| 1,543,208 | Fairchild | June 23, 1925 |
| 1,791,112 | Azarraga | Feb. 3, 1931 |
| 2,269,401 | Steiner | Jan. 6, 1942 |
| 2,311,822 | Frankel | Feb. 23, 1943 |
| 2,504,011 | Dunlap | Apr. 11, 1950 |

FOREIGN PATENTS

| 409,777 | Great Britain | May 10, 1934 |
| 1,003,952 | France | Nov. 21, 1951 |